UNITED STATES PATENT OFFICE.

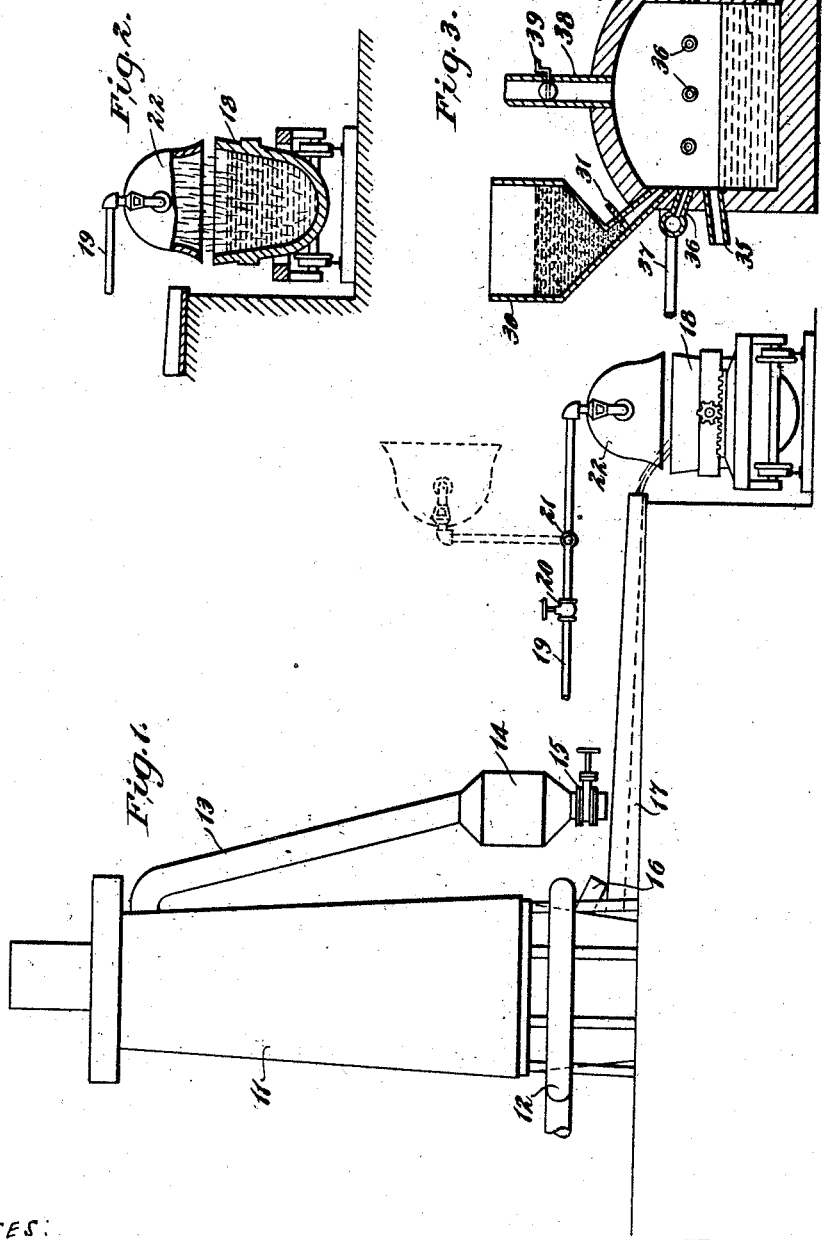

SAMUEL L. BOGGS, OF PITTSBURGH, PENNSYLVANIA.

PROCESS FOR REDUCING FLUE-DUST AND OTHER METAL FINES.

1,190,712.     Specification of Letters Patent.     Patented July 11, 1916.

Application filed April 9, 1914. Serial No. 830,755.

*To all whom it may concern:*

Be it known that I, SAMUEL L. BOGGS, a resident of Pittsburgh, in the county of Allegheny and State of Pennsylvania, and a citizen of the United States, have invented certain new and useful Improvements in Processes for Reducing Flue-Dust and other Metal Fines, of which the following is a specification.

My invention relates to reduction of what are ordinarily waste products incident to reducing ores and refining metals, and my particular object is to furnish a process by means of which such waste products, as flue-dust for example, may be gathered as it comes from the furnace, and may be reduced by means of the molten metal incident to reduction in the main furnace, and a blast furnished by gas generated in the furnace.

My invention may be practised by mixing the flue-dust or fines in the molten metal as it comes from the reduction furnace, allowing the mixture to pour from some height into a receptacle, and then of applying to the surface of the mixture in the receptacle a blast of the gas generated in the main furnace. Of course, fines which have been stored may be reduced by this same process, and the gas may be otherwise generated.

In the drawings I show a convenient form of apparatus for practising my method.

Figure 1 is a diagrammatic elevation of apparatus connected to a blast furnace whereby to practise my method; Fig. 2 is a partial vertical section through a ladle car in which the final stage of my process is carried out; and Fig. 3 shows a supplemental furnace adapted to carry out a modification of my method.

A proper mixture of ore and reducing agents is placed in the blast furnace 11 and the ordinary combustion gases introduced thereto by pipe 12. The flue-dust incident to reduction in such furnaces is carried off by down-comer 13 and received in collection box 14, the outlet of which is controlled by valve 15. The furnace spout 16 empties into a trough, or runner, 17, which is inclined and adapted to empty the liquid metal flowing therethrough into the ladle car 18. The pipe 19, controlled by valve 20, taps the supply line of excess gas generated in the furnace. By means of pivoted joint 21 there is connected to this pipe a gas bell, or burner, 22. The joint 21 is so arranged that this burner may be raised out of the way, or may be lowered so as to approximately fit over the mouth of the ladle car 18. In this practice of my process the furnace is tapped, molten metal flows out the spout 16 and down the trough 17. The gate 15 is opened, allowing flue-dust to fall upon the surface of the molten metal stream. This stream pouring from the end of the trough falls into the ladle 18 and is mixed therethrough, both in its travel from the point of combination and by means of the agitation caused by the pouring out at the end of the trough 17. Since the molten metal comes from the furnace at a heat which is considerably above that necessary for reduction of metal fines, the mixing of the metal and fines will of itself separate most of the latter. The subsequent agitation and mixing in the ladle 18 continues this separation, and the gas blast effects reduction. However, I find that a certain percentage of the flue-dust will not be reduced by this mixing and will float in the form of a matte on top of the liquid contents of the ladle. In order to reduce this matte, I lower the gas bell 22 and introduce by this means a blast of carbon-monoxid gas taken from the blast furnace itself. This gas is, in addition to its great heating powers, peculiarly effective in reducing flue-dust and fines. Also, this gas is forced against the molten metal surface with sufficient force to agitate it, and to further stir the contents of the ladle. I find that this additional step greatly increases the efficiency of the method of reduction which up to this point has been partially disclosed in my Patent No. 1083724 January 6th, 1914. In certain cases, depending on the character of the ores, it may be necessary to add a further reducing agent to the layer of dust on top of the ladle. Therefore I may spread a light layer of coke dust over the top of the ladle before applying the blast. This aids in reduction, and tends to produce a metal sponge, even where the fines are not entirely reduced to metal.

At a great many plants flue-dust and other fines have been simply dumped as a waste product.

In Fig. 3 I show apparatus designed for the practise of my process independently of an actively operating blast furnace. In the hopper 30 the fines are collected. The gate 31 controls the feeding of the fines to the furnace 32, which is partially filled with molten metal 33, and which has a metal draw-off 34 and a slag outlet 35, and blast inlets 36, connected by pipe 37 to any convenient source of carbon and oxygen gas. A flue 38 with damper control 39 is provided.

Where the fines consist of metallic particles mixed with coke, ashes, etc., such metallic particles will be separated by their mingling with the molten metal, but where the fines have a large proportion of metallic oxids, I find it necessary to add a fluxing agent, such as powdered limestone, or other available form of calcium. When this is done and the blast applied for a short time, the reduction will be practically complete.

The great efficiency, and the simplicity of reducing flue-dust just as it is made, without storage, and by means of the coincident products of the blast furnace, that is molten metal and carbon and oxygen gas will be apparent to those familiar with this art. The further fact that this reduction may be done in the very ladle which is used for carrying off the molten metal adds to the value of my process.

Having thus described my invention and illustrated its use, I claim:

1. The process of reducing flue-dust, or fines, consisting of emptying the dust into molten metal whereby the two are mingled, and then applying a blast of the gas generated in the furnace to the surface of said mixture.

2. The process of reducing metal fines consisting of mixing the dust with molten metal, pouring the mixture into a receptacle, applying a layer of coke braize to the top of said mixture, and then turning a blast upon the surface of the latter mixture.

3. The process of reducing flue-dust or other fines of metal consisting of the successive steps of mixing the dust with flowing molten metal, allowing the mixture to pour into a receptacle, and applying a blast of carbon and oxygen gas from a blast furnace to reduce the fines.

4. The process of reducing flue-dust or other metal fines consisting of mixing said dust with molten metal as it is drawn from a blast furnace, allowing the mixture to pour into a receptacle, adding to the mixture a layer of coke braize, and applying thereto a blast of the gas generated in the furnace.

5. The process of collecting flue-dust of a blast furnace, emptying it into molten metal as it comes from the furnace, pouring the mixture into a receptacle, adding a layer of carbonaceous material to the mixture, and applying thereto a blast of the gas generated in the first reduction furnace.

6. The process of reducing ore dust by mixing it with molten metal and applying on top of the mixture a hot blast of reducing gas, substantially as described.

7. The process of reducing ore dust by mixing it with molten metal, adding a separate fluxing and reducing agent and applying a hot gas blast to the top of the mixture.

In testimony whereof I have hereunto signed my name in the presence of the two subscribed witnesses.

SAMUEL L. BOGGS.

Witnesses:
    Jo. BAILY BROWN,
    FRED'K STAUB.